US008717965B2

(12) United States Patent
Chang et al.

(10) Patent No.: US 8,717,965 B2
(45) Date of Patent: May 6, 2014

(54) ENHANCING WIMAX PERFORMANCE WITH SUBSCRIBER STATIONS ACTING AS AD HOC REPEATERS

(75) Inventors: Chu-Rui Chang, Plano, TX (US); Farhad Bassirat, Fairfax, VA (US)

(73) Assignee: Apple Inc., Cupertino, CA (US)

( * ) Notice: Subject to any disclaimer, the term of this patent is extended or adjusted under 35 U.S.C. 154(b) by 1486 days.

(21) Appl. No.: 11/998,856

(22) Filed: Nov. 30, 2007

(65) Prior Publication Data
US 2008/0186900 A1 Aug. 7, 2008

Related U.S. Application Data

(60) Provisional application No. 60/868,221, filed on Dec. 1, 2006, provisional application No. 60/870,283, filed on Dec. 15, 2006.

(51) Int. Cl.
| H04B 7/14 | (2006.01) |
| H04B 7/155 | (2006.01) |
| H04W 72/12 | (2009.01) |
| H04B 7/26 | (2006.01) |

(52) U.S. Cl.
CPC ........ H04B 7/15557 (2013.01); H04B 7/15542 (2013.01); H04B 7/14 (2013.01); H04W 72/1263 (2013.01); H04B 7/2606 (2013.01)
USPC ......................................... 370/315; 455/450

(58) Field of Classification Search
USPC ........... 455/7, 226.3; 370/280, 294, 314, 330, 370/395.4, 442, 458, 478, 492
See application file for complete search history.

(56) References Cited

U.S. PATENT DOCUMENTS

| 5,321,542 A | * | 6/1994 | Freitas et al. | 398/127 |
| 5,737,359 A | * | 4/1998 | Koivu | 375/133 |
| 6,694,147 B1 | * | 2/2004 | Viswanath et al. | 455/517 |

(Continued)

FOREIGN PATENT DOCUMENTS

WO    WO 2006/043903    4/2006

OTHER PUBLICATIONS

Christian Hoymann, Karsten Klagges. Wireless World Research Forum, MAC Frame Concepts to Support Multihop Communication in IEEE 802.16 Networks. Apr. 2006. http://www.comnets.rwth-aachen.de/research-group/alumni-staff-members/postgraduates/dr-ing-dipl-kaufmann-hoymann-christian/publications.html.*

(Continued)

*Primary Examiner* — Ian N Moore
*Assistant Examiner* — Dung B Huynh
(74) *Attorney, Agent, or Firm* — Meyertons, Hood, Kivlin, Kowert & Goetzel, P.C.

(57) ABSTRACT

A wireless communications network includes a subscriber station acting as a relay station (or ad-hoc repeater) between another subscriber station (a child subscriber station) and a base station (BTS) when there is no LOS between the other subscriber station and the base station, but there is LOS between the other subscriber station and the relay station. The BTS divides each of the downlink (DL) and uplink (UL) sub-frames into P1 and P2 portions and schedules transmissions of child subscriber DL and UL data during P1 of the DL and UL frames (from the BTS), respectively. The relay station receives the child subscriber DL and UL data, stores the data, and transmits/forwards the child subscriber DL and UL data during P2 of the DL and UL frame (to the BTS), respectively.

16 Claims, 4 Drawing Sheets

(56) References Cited

U.S. PATENT DOCUMENTS

| | | | |
|---|---|---|---|
| 7,177,645 B2* | 2/2007 | Goldhamer | 455/447 |
| 7,215,660 B2* | 5/2007 | Perlman | 370/338 |
| 8,054,783 B2* | 11/2011 | Etemad et al. | 370/329 |
| 2003/0156553 A1* | 8/2003 | Benveniste | 370/317 |
| 2005/0059342 A1* | 3/2005 | Engels et al. | 455/7 |
| 2006/0046643 A1* | 3/2006 | Izumikawa et al. | 455/7 |
| 2006/0050627 A1* | 3/2006 | Etemad et al. | 370/208 |
| 2006/0264172 A1* | 11/2006 | Izumikawa et al. | 455/11.1 |
| 2007/0015461 A1* | 1/2007 | Park et al. | 455/13.1 |
| 2007/0064638 A1* | 3/2007 | Banniza et al. | 370/315 |
| 2007/0081483 A1* | 4/2007 | Jang et al. | 370/315 |
| 2007/0201392 A1* | 8/2007 | Ramachandran | 370/315 |
| 2007/0280172 A1* | 12/2007 | Tan et al. | 370/335 |
| 2008/0013606 A1* | 1/2008 | Boariu et al. | 375/211 |
| 2008/0043817 A1* | 2/2008 | Beems Hart et al. | 375/135 |
| 2008/0070582 A1* | 3/2008 | Cai | 455/450 |
| 2008/0108355 A1* | 5/2008 | Oleszcsuk | 455/442 |
| 2009/0011700 A1* | 1/2009 | Nishio et al. | 455/7 |
| 2009/0073915 A1* | 3/2009 | Zhang et al. | 370/315 |
| 2009/0201900 A1* | 8/2009 | Suga | 370/338 |

OTHER PUBLICATIONS

"Some considerations on Mobile Multi-hop Relay Based System" by Aimin Zhang et al. submitted on Apr. 30, 2006 (replaced with May 2, 2006.*

Christian Hoymann, et al., "Multihop Communication in Relay Enhanced IEEE 802.16 Networks," The 17th Annual IEEE International Symposium on Personal, Indoor and Mobile Radio Communications (PIMRC06), 4 pages.

Christian Hoymann, "Analysis and performance evaluation of the OFDM-based metropolitan area network IEEE 802.16," Computer Networks 49 (2005), pp. 341-363.

International Search Report issued on Jun. 5, 2008 in International Patent Application No. PCT/US2007/024703.

Written Opinion of the International Searching Authority issued on Jun. 5, 2008 in International Patent Application No. PCT/US2007/024703.

* cited by examiner

ENHANCING WIMAX PERFORMANCE WITH SUBSCRIBER STATIONS ACTING AS AD HOC REPEATERS

CROSS-REFERENCE TO RELATED APPLICATION

This application claims priority under 35 USC 119(e) to U.S. Provisional Application Ser. No. 60/868,221, filed on Dec. 1, 2006, and U.S. Provisional Application Ser. No. 60/870,283, filed on Dec. 15, 2006, and which are incorporated herein by reference.

TECHNICAL FIELD

The present invention relates generally to wireless communication systems, and more particularly to a network architecture and method utilizing subscriber stations as relay stations between subscribers stations and an access point (e.g., base station) within a WiMAX access service network.

BACKGROUND

The Worldwide Interoperability for Microwave Access Forum (WiMAX) has developed a specification that describes a radio interface for wireless data communications. This specification is known as the Institute of Electrical and Electronic Engineers (IEEE) 802.16e-2005 standard, and is incorporated herein by reference. WiMAX is intended to provide higher capacity, allow greater communications distances and provide mobility (access across different access points).

Users (and their communications devices known as "subscriber stations") gain wireless connectivity in an access service network (ASN) via an access point (AP). WiMAX access points (also known as base stations) are similar to cellular access points, with each base station (BTS) generally including a tower with antenna(s) and base station transceiver(s). Once connected, users have the ability to roam from one base station to another. Within the network, each BTS is connected (via wireless or wireline) to a controller node identified as a "gateway" (GW). Each gateway is generally responsible for controlling and communicating with a number of BTSs and is connected to a global network.

Deployment and functioning of WiMAX-based networks faces many challenges that are similar to challenges faced in cellular/PCS networks, however, some of these challenges are more pronounced for WIMAX. Because WiMax operates in high frequency bands (2.5 GHz to 11 GHz), the shadowing effect is more severe. At frequencies around and above 3.5 GHz, line of sight (LOS) is generally required to achieve high data rates. While urban areas are places where high data rates would be beneficial, these urban areas also exacerbate the LOS problem (e.g., buildings, obstacles, etc). Some locations will have no LOS, while other locations will have acceptable LOS around the cell center (BTS location), with poor LOS in areas further from the cell center.

WiMAX is designed for high data rates. Typically, high data rates can only be achieved with high signal-to-noise ratios (SNRs). Because LOS is not possible in most locations, many subscriber stations are severely impacted in locations resulting in no. LOS with low SNR. Often a subscriber station behind an obstacle may acquire the network (i.e., the control channel can be detected), but data throughput rates are low. A high number of users will be in disadvantaged locations that will not support high data rates between the subscriber station and BTS. Therefore, combating the shadow/LOS problem is a major issue in the deployment and operation of WiMax at higher frequencies in urban and dense urban areas.

The shadowing effect, to a lesser degree, is also present in cellular/PCS networks. Several solutions have been proposed to combat this problem in cellular/PCS networks. These solutions include utilizing a higher number of BTSs to cover the same area, over-the-air repeaters and antenna diversity or MIMO (for OFSM/OFDMA systems). Increasing the number of BTSs is costly (e.g., hardware, real estate, antenna towers, backhaul, operating cost). Over-the-air repeaters used in cellular systems are "amplify-and-forward" repeaters that use analog power amplifiers with at least a 10 dB noise figure. Use of such repeaters not only injects significant and unacceptable noise into the sector, these repeaters are costly (e.g., hardware, real estate, operating cost, etc.). Although antenna diversity and MIMO are low cost solutions, these are not effective (e.g., only increase signal by +3 dB, where SNR loss due to shadowing is on the order of −6 dB or greater).

Accordingly, there is needed an effective (and low cost) solution that provides high data rates to subscriber stations in disadvantaged locations.

SUMMARY

In accordance with one embodiment, there is provided a method of operating a base station in a wireless communications network. The method includes scheduling the base station to transmit downlink (DL) data for a subscriber station within a first portion P1 of a DL frame. One or more DL frames having scheduling information are transmitted from the base station. The scheduling information is operable for scheduling transmission of the DL data from a relay station located remotely from the subscriber station within a second portion P2 of a DL frame, for scheduling transmission of uplink (UL) data from the subscriber station within a first portion P1 of a UL frame, and for scheduling transmission of the UL data from the relay station to the base station within a second portion P2 of a UL frame. The UL data is received at the base station from the relay station.

In accordance with another embodiment, there is provided a method of operating a relay station in a wireless communications network. The method includes receiving a first radio frequency (RF) signal from a base station carrying downlink (DL) data for a subscriber station located remotely from the relay station, the first RF signal received during a first portion P1 of a DL frame. The RF signal is demodulated to recover the DL data, the DL data is stored, and the stored DL data is modulated to generate a second RF signal. The second RF signal is transmitted during a second portion P2 of a DL frame for reception by the subscriber station.

In yet another embodiment, there is provided a base station for communicating with one or more remote communication devices in a wireless network. The base station includes a processor, memory coupled to the processor, a transceiver, having an antenna coupled thereto, operable for transmitting and receiving DL frames and UL frames to the one or more remote communications devices, and a scheduler. The scheduler is operable for scheduling the base station to transmit downlink (DL) data for a first communication device within a first portion P1 of a DL frame, scheduling transmission of the DL data from a second communication device located remotely from the first communication device within a second portion P2 of a DL frame, scheduling transmission of uplink (UL) data from the first communication device within a first portion P1 of a UL frame, and scheduling transmission of the UL data from the second communication device to the base station within a second portion P2 of a UL frame Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
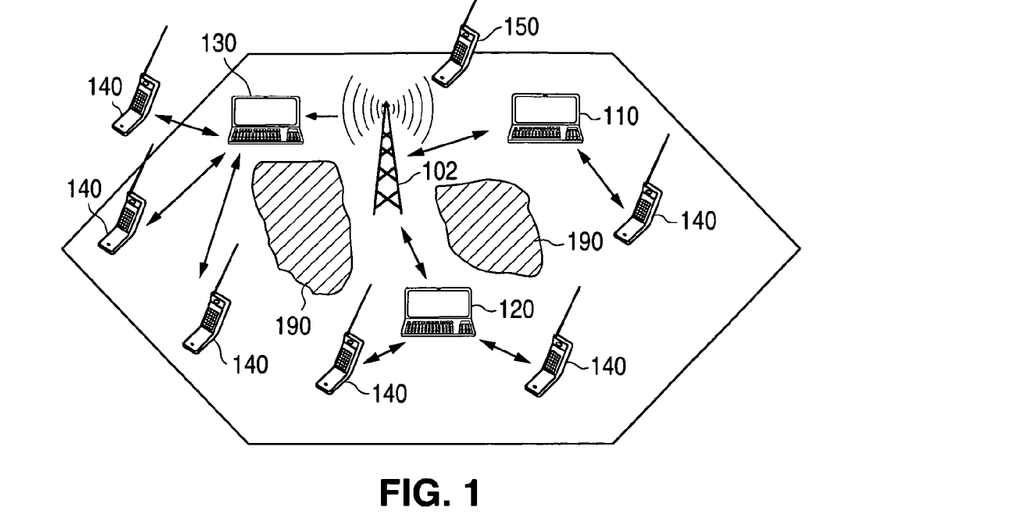
FIG. 1 depicts a high level diagram of an example communications cell and devices within a WiMAX wireless communications network.

FIG. 1 illustrates an example communications network architecture or system 100 in accordance with the present disclosure. The system or network 100 shown in FIG. 1 is for illustration purposes only, and represents a cell or sector. Other embodiments of the system 100 may be used without departing from the scope of this disclosure. Reference to "standards" in the following text is meant to encompass existing and future versions of the referenced standards, as well as standards encompassing the principles of the subject matter disclosed and claimed herein.

In this example, the system 100 is part of a larger access services network (not shown), and the system 100 includes a base station (BTS) 102 communicating with a plurality of subscriber stations (SS) 110, 120, 130, 140, 150. In the example shown, the BTS 102 communicates directly with stations 110, 120, 130 and 150, while the BTS 102 communicates indirectly with the stations 140 via one of the subscriber stations 110, 120, 130 which also function as ad-hoc repeaters or relay stations. In one embodiment, the access services network (not shown) and system 100 (or portions thereof) is a wireless communications network compliant or operating in accordance with the IEEE 802.16d or 802.16e standard (WiMAX) (or later versions). Though only one BTS 102 is shown, the system 100 may include additional BTSs and additional subscriber stations. Each of the BTS 102 and subscriber stations generally includes one or more antennas and various hardware and software components.

The access services network (not shown) may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. The access services network typically also includes a BTS backhaul network (not shown) which is a data network utilized for communications between the BTSs and gateways. These networks may be configured to include Internet, packet networks and the like. In one specific embodiment, access services network (or portions thereof) is an Internet Protocol (IP) based network.

Other components, devices or networks may be included in the system 100, and FIG. 1 only illustrates but one exemplary configuration to assist in describing the system and operation of the present invention to those skilled in the art. The system represented in FIG. 1 may be described using different nomenclature or system terminology, such as use of the terms access terminal (AT) or mobile subscriber terminals (MS or MT), base station or base transceiver station (BTS), and the use of any given nomenclature to describe a device within the system 100 is not intended to limit the scope of this disclosure.

The WiMAX standard defines two network architectures or modes: point-to-multipoint (PMP) mode and mesh mode. In the PMP modes, every subscriber station directly communicates with a BTS and may indirectly communicate with another subscriber station but only through the BTS first. This network has a star structure with the BTS at the center of the star. In the mesh mode, every subscriber station is operable to directly communicate with every other subscriber station—the BTS is not required.

The architecture of mode illustrated in FIG. 1 is a modified PMP. This architecture includes three main and distinct components: the BTS 102, the relay stations 110, 120, 130 (which may also function as subscriber stations), and the subscriber stations 140, 150. This architecture has a double star structure with the BTS at the center of the star and each relay station 110, 120, 130 as a second level of the star. In system 100, the relay stations also include the functionality of the subscriber stations and the BTS maintains some control over all communications in the system 100. Subscriber stations 140, 150 are operable to communicate directly with the BTS 102 or the relay stations 110, 120, 130 and are not required to communicate, or have communication capabilities, directly with each other.

The BTS 102 has coupled thereto the subscriber stations (several shown). The subscriber stations are operable for communicating wirelessly with (or to) the BTS 102 over an air interface. In the system 100, each of the subscriber stations identified by reference numerals 110, 120, 130 has the capability to function not only as a conventional subscriber station, but also function as a "relay station." The relay stations 110, 120, 130 include additional hardware and/or software to provide relay capabilities and functions, as more fully described below. The other subscriber stations identified by reference numerals 140, 150 are conventional.

With continued reference to FIG. 1, each of the subscriber stations 140 is positioned at disadvantaged locations. A disadvantaged location is a location where there is no LOS (low SNR) with the BTS 102. This usually occurs as a result of some obstacle (man-made or natural), such as those identified by reference numeral 190, or in combination with some other operating characteristic of the system 100 (e.g., obstacles and high number of users). Meanwhile, the subscriber station 150 is in a good location (LOS and good SNR), and as a result, communicates directly with the BTS 102.

The subscriber stations 140 in disadvantaged locations communicate with the BTS 102 by directly communicating with the one of the relay stations 110, 120, 130 (indirect communication with the BTS 102). In this architecture and method, active stations 110, 120, 130 located in advantaged locations are utilized as ad-hoc repeaters (or relay stations) for subscriber stations 140 located in disadvantaged locations.

The structure and functionality of a conventional BTS are generally well-known. A conventional BTS generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of a BTS, other than as noted herein or relevant for an understanding of the present disclosure, is provided, as these are known to those of ordinary skill in the art. It will be understood that the BTS 102 may be constructed or configured from any suitable hardware, software, firmware, or combination thereof for providing the functionality known to those of ordinary skill in the art. The BTS 102 will include additional functionality as described below in accordance with one or more embodiments.

The subscriber stations 140, 150 represent devices utilized by a user or subscriber during communication sessions over/within the system 100. The subscriber stations 140, 150 typically include a processor, memory, a transceiver and an antenna and may be constructed or configured from any suitable hardware, software, firmware, or combination thereof for transmitting or receiving information over a network. These devices may further include an input/output device having a microphone and speaker to capture and play audio information, as well as a camera and/or a display to capture/display video information. As an example, the subscriber stations 140, 150 may be a telephone, videophone, computer, personal digital assistant, and the like, etc.

The relay stations 110, 120, 130 (subscriber stations acting as relay stations) include the same or similar components and functionality as the conventional subscriber stations 140, 150 (as described above), but include some added components and/or functionality as described below in accordance with one or more embodiments.

One embodiment of WiMAX employs time division duplexing (TDD). For TDD, communication between BTSs and subscriber stations utilizes TDD frames. A TDD frame (5 msec frame duration) is partitioned into a preamble, a downlink (DL) sub-frame and an uplink (UL) sub-frame (and guard times). Each of the sub-frames includes control and data. The organization and functioning of the conventional TDD frame is well understood by those of skill in the art, and therefore, no further description of the TDD frame will be provided, except as may be beneficial for an understanding of the present disclosure.

In a TDD system, the BTS 102 and relay stations 110, 120, 130 include additional functionality to perform the different functions and methods described herein. These additional functions and methods may be implemented with no additional hardware components added to the BTS or relay stations. No additional functionality (hardware or software) is necessary for the subscriber stations 140, 150 to benefit from the teachings herein—these stations may be conventional.

Figure 8:
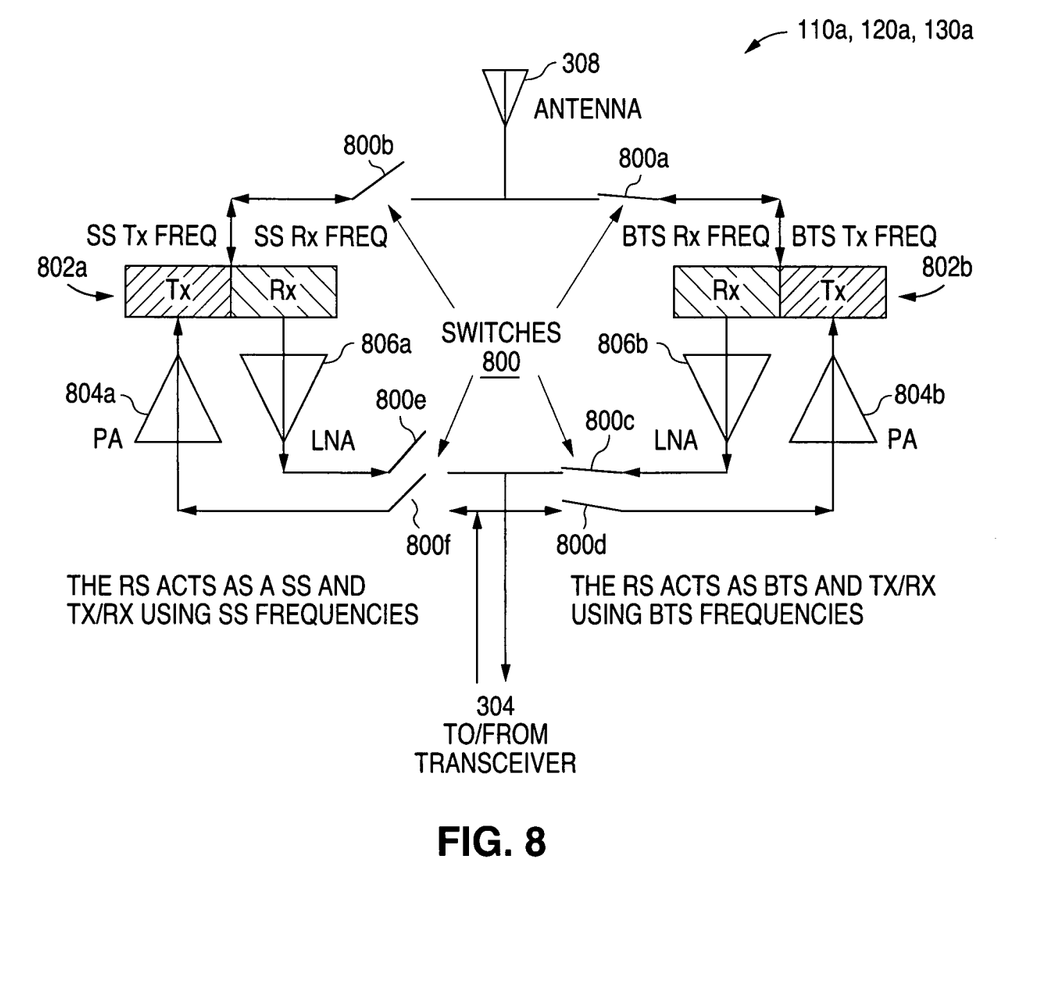
FIG. 8 describes a front-end for a relay station operating in the frequency division duplexing (FDD) mode in accordance with the present disclosure.

In WiMAX employing frequency division duplexing (FDD), the BTS 102 and relay stations 110, 120, 130 will include additional functionality to perform the different functions and methods described herein. These may be implemented without additional hardware components added to the BTS, however, for FDD, the relay stations 110, 120, 130 are constructed to transmit/receive at both BTS frequencies and subscriber frequencies. Therefore, the relay station 110, 120, 130 include two sets of transceiver components (duplexer, power amplifier, low noise amplifier) and a switching mechanism to enable the relay station to communicate with the subscriber station 140 during one time period and communicate with the BTS 102 during another time period. This is illustrated in FIG. 8 and described in more detail further below. Similar to the TDD system, no additional capabilities (hardware or software) are necessary for the subscriber stations 140, 150 in the FDD system.

In general terms, the present disclosure describes the use of active subscriber stations located in advantaged locations as ad-hoc repeaters for other active subscriber stations located in disadvantaged locations. Those stations acting as relay stations may be described as "store-and-forward" repeaters. In operation, the relay stations 110, 120, 130 receive a message from the source (the subscriber station 140 or BTS 102), extract the relevant data from the received message, incorporate the data into a new message, and transmit (forward) the new message to the destination (the BTS 102 or subscriber station 140). Thus, the stations 110, 120, 130 relay or forward data from a remote source (BTS or subscriber station) to a destination (subscriber station or BTS). This is different from a standard repeater that simply amplifies and forwards the data.

With a higher number of active users, there is an increased likelihood that one or more subscriber stations—operating as a relay station—are available to enable communications between a disadvantaged subscriber station (such as 140) and the BTS 102. This architecture and method allows for a BTS-subscriber station communication path to go around obstacles through a one-hop relay that effectively eliminates shadow and no-LOS conditions. The higher number of relay stations in the network, the higher the capacity and better coverage.

Figure 2:
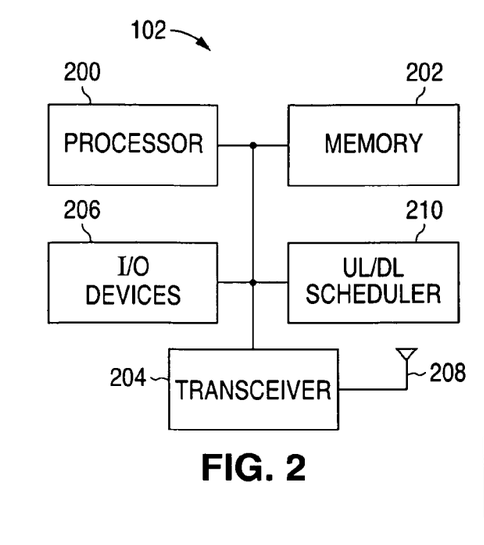
FIG. 2 is a block diagram of a base station shown in FIG. 1.
Figure 3:
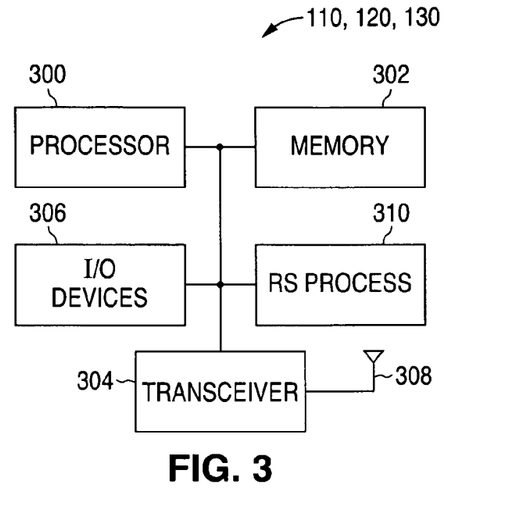
FIG. 3 is a block diagram of a relay station shown in FIG. 1.

Operation of the system 100 (for an understanding of the present disclosure) and general block diagrams of the BTS 102 and a relay station 110, 120, 130 will now be described.

Now turning to FIG. 2, there is shown a block diagram of the BTS 102 in accordance with the present disclosure. The BTS 102 includes a processor (which may include a digital signal processor) 200, a memory 202, a transceiver 204, input/output devices 206, and an antenna 208. Other components may be included, but not shown. Details of the operation and structure of these components, except as necessary to illustrate the operations and methods described herein, have been omitted. The BTS 102 includes a scheduler 210. Though shown as a separate component, the scheduler 210 is normally a software process (or logical entity) that controls and manages scheduling of the UL and DL data transmissions (e.g., media access protocol—MAP) between the BTS 102 and stations 110-150. This scheduling information is carried in DL sub-frames (control channel).

Now turning to FIG. 3, there is shown a block diagram of a relay station 110, 120, 130 in accordance with the present disclosure. The relay station includes a processor (which may include a digital signal processor) 300, a memory 302, a transceiver 304, input/output devices 306, and an antenna 308. Other components may be included, but not shown. Similarly, details of the operation and structure of these components, except as necessary to illustrate the operations and methods described herein, have been omitted. The relay station 110, 120, 130 includes a relay station process 310. Though shown as a separate component, the relay station process 310 represents an additional or modified software process (or logical entity) enabling the relay station to operate as described herein.

As a general description, each relay station 110, 120, 130 establishes a communication session with the BTS 102, receives UL frames from other subscriber stations, determines signal-to-noise ratio (SNR) between those subscriber stations and itself, forwards this information to the BTS 102, and receives subscriber data scheduling information from the DL sub-frame(s). With knowledge of the allocated slots, the relay station receives a subscriber station's DL data (children DL data) during a first part of a received DL sub-frame, extracts and stores this DL data, and transmits/forwards the DL data to the subscriber station (children) during a second part of the DL sub-frame. For UL, with knowledge of scheduling information, the relay station receives a subscriber station's UL data (children UL data) during a first part of the UL sub-frame, extracts and stores the DL data, and transmits/forwards the DL data to the BTS 102 during a second part of the UL sub-frame.

Each subscriber station functioning as a relay station 110, 120, 130 engages in a discovery process or mechanism to identify those subscriber station(s) 140 for which it will serve as a relay station. Such subscriber station(s) are referred to as a "child" or "children" of a given servicing relay station.

A method of discovering or identifying subscriber stations as potential children includes the relay station detecting and measuring the uplink (UL) SNR from subscriber station(s). Each relay station 110, 120, 130 maintains a list of its children based on measured SNR of subscriber station uplink (UL) activities and/or BTS information. During operation, each relay station 110, 120, 130 "listens" for UL sub-frames or signals from the subscriber stations. This UL detection mechanism is beneficial since no modifications to the subscriber stations 140 are necessary, therefore, any subscriber station can benefit from a relay station.

In a different method, special or additional communications between a relay station and subscriber station are utilized. In this method, the subscriber stations are able to recognize communications with a relay station (as compared to communication with the BTS 102) and, therefore, require additional functionality in the subscriber stations. Though this method may be used, the UL detection method noted above and described more fully below may be more beneficial.

Figure 4:
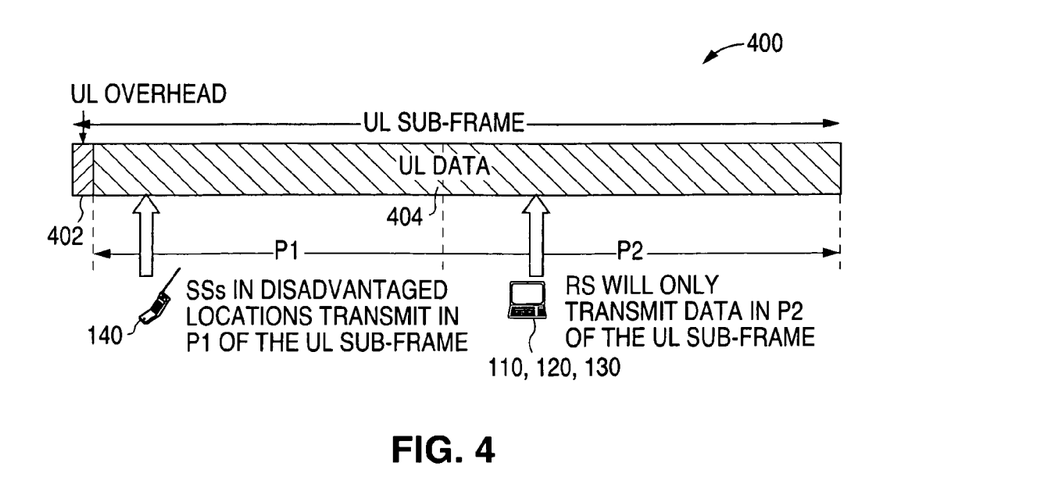
FIG. 4 illustrates an uplink (UL) sub-frame.

The UL detection method (discovery of a potential new child) will now be described in additional detail with reference to FIGS. 4 and 5.

It will be understood that UL scheduling or resource allocation is done in terms of "areas" in the time*frequency space. Each user (e.g., subscriber station or relay station) is scheduled to transmit in the UL at a certain time interval and at certain frequency tones. FIG. 4 illustrates a conventional uplink (UL) sub-frame 400 that includes a UL header 402 and UL data 404. The UL header 402 includes control channels plus overhead information. In accordance with the present disclosure, the UL data 404 is divided into two parts: P1 and P2. The sizes of P1 and P2 may be fixed (same or different sizes) or dynamically variable. In one embodiment, the UL scheduler 210 within the BTS 102 may dynamically change P1 and P2.

Within the system 100 (and according to the present disclosure), the scheduler 210 within the BTS 102 schedules the subscriber stations 140, 150 (the "children" SS and regular SS) to transmit during the P1 time period, and schedules the relay stations 110, 120, 130 to transmit during the P2 time period. During P1, the relay stations 110, 120, 130 listen and receive the UL signals from nearby subscriber stations.

Figure 5:
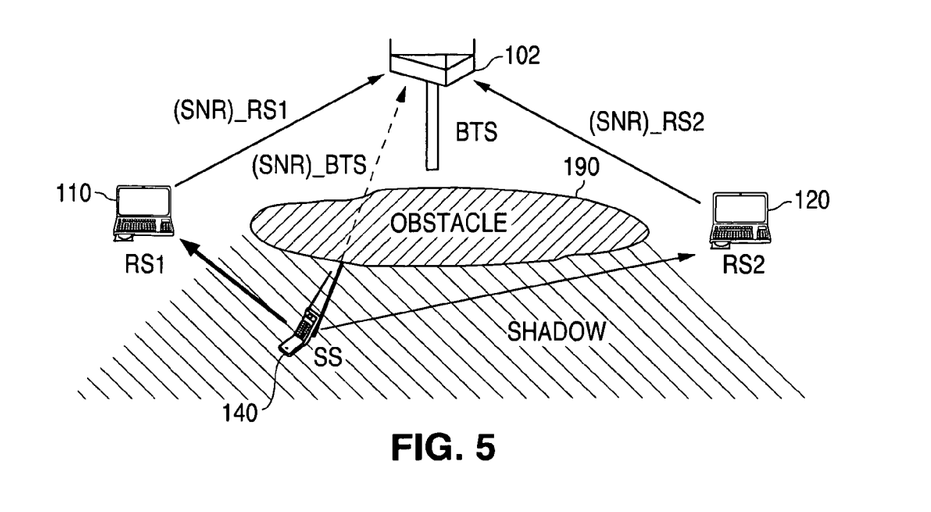
FIG. 5 depicts the example communication cell illustrating a UL detection method in accordance with the present disclosure.

Now with reference to FIG. 5, there is illustrated, for purposes of example, the BTS 102, a first relay station (RS1) 110 and a second relay station (RS2) 120, a subscriber station (SS) 140 and an obstacle 190 blocking or interfering with direct communications between the BTS 102 and the subscriber station 140.

Assuming the subscriber station 140 has accessed the network conventionally (i.e., access probe with ID information, and receipt of a DL sub-frame from the BTS 102 with an initial schedule allocation), the subscriber station 140 transmits a UL sub-frame (in the form of RF signals) which is received at the BTS 102. The BTS 102 determines/measures the signal's strength (in the example, SNR is utilized). If the received signal's SNR is below a threshold, the BTS 102 determines that the subscriber station 140 is located in a disadvantaged location and is, therefore, a candidate to utilize a relay station.

Each of the relay stations 110 and 120 (being nearby) also receive a UL sub-frame transmitted from the subscriber station 140 and determine/measure its SNR. This (these) received UL sub-frame could be the same UL sub-frame received at the BTS (see above) or could be one or more subsequent transmitted UL sub-frames. When the subscriber station 140 is not currently a child of the relay station(s) 110, 120, and the measured SNR is above a threshold, the relay station(s) 110, 120 will transmit the measure SNR values to the BTS 102. From the known UL scheduling information, the BTS 102 is able to identify the subscriber station 140. This SNR information is included in the relay stations' respective UL sub-frame(s) data transmitted to the BTS 102 (e.g., in the UL control channel(s), overhead fields or new fields, or in relay station's allocated data field). Alternatively, this information may be communicated in another way or manner.

Next, the BTS 102 separately compares the SNR(BTS) measured at the BTS 102 with the SNR(RS1) and SNR(RS2) reported from the relay station 110 and relay station 120, respectively (assuming the SNR at the particular RS is meets the threshold for reporting to the BTS 102). If SNR(RSx) minus SNR(BTS) is greater than a threshold (e.g., greater than SNR(BTS) by a predetermined value), the subscriber station 140 has a good link to relay station 110 (or relay station 120) but a poor link to the BTS 102. When the threshold is met, the subscriber station 140 is considered a good candidate to function as a child subscriber station and communicates with the BTS 102 through the relay station 110 or 120. Otherwise, relaying would likely not be beneficial.

In this example, both relay stations RS1 and RS2 report the respective measured SNR to the BTS 102. The BTS 102 selects the relay station reporting the highest SNR to be the "parent" of the child subscriber station 140 and assigns or registers the subscriber station 140 as the child of the selected relay station. In other embodiments, the BTS 102 may select one relay station from multiple potential relay stations based on other factors or other reason(s) (e.g., the RS is overloaded, etc.). This information is communicated to the assigned relay station and its children list is maintained.

Each relay station generally has a maximum number of supported children it may handle. This maximum number depends on the relay station's processing power and capabilities, which may be different for different relay stations. When the maximum number is reached, the relay station no longer reports the SNR of any new subscriber station, and the BTS 102 does not assign other subscriber stations to that relay station.

Certain events may trigger termination or tear down of the established parent-child relationship. For example, the relay station may utilize a timer to determine that the subscriber station has not transmitted communications received by the relay station. In these circumstances, the subscriber station may have been powered off or moved outside the area. In this event, the relay station de-registers or unassigns its child and may notify the BTS 102 the subscriber station is no longer its child. Additionally, if the SNR of the signals from the subscriber station fall below a threshold (e.g., for a period of time) termination or BTS notification may occur.

In general terms, there are three types of active subscriber stations (or users): (1) a regular SS directly communicating with the BTS (i.e., not a child), (2) a relay SS (or relay station) directly communicating with the BTS and relaying communications between another SS and the BTS, and (3) a child SS. A regular SS (such as SS 150) directly communicates with the BTS 102 because it is located either at an advantaged location or at a disadvantaged location with no relay station nearby to assist. A relay station is located at an advantaged location and is relay capable. A child SS is located at a disadvantaged location and communicates with the BTS 102 via a relay station acting as its parent.

Figure 6:
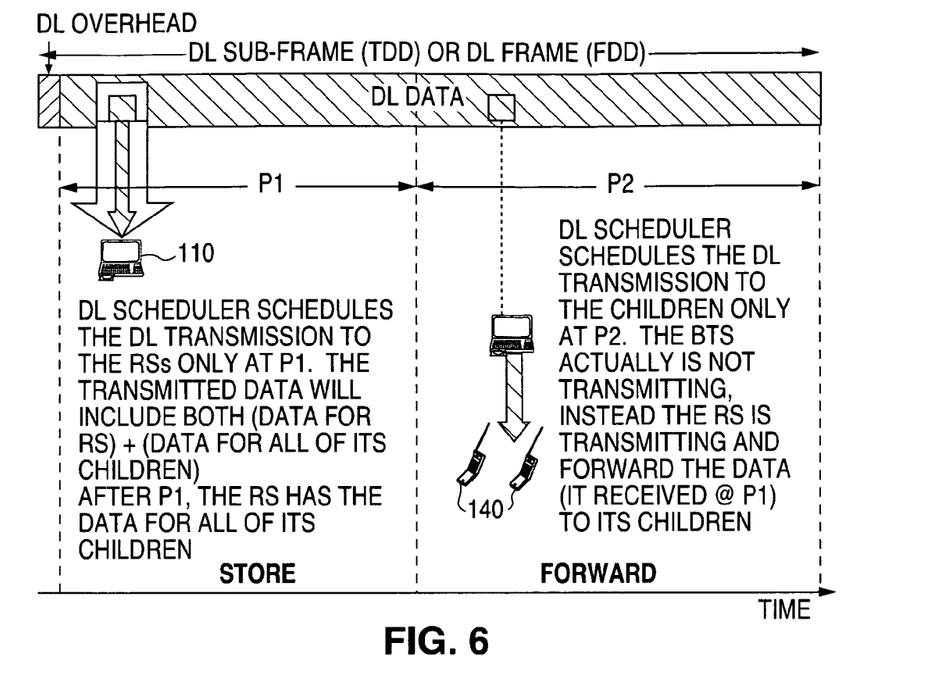
FIGS. 6 and 7 illustrate a downlink (DL) sub-frame and an uplink (UL) sub-frame utilized in accordance with the present disclosure.
Figure 7:
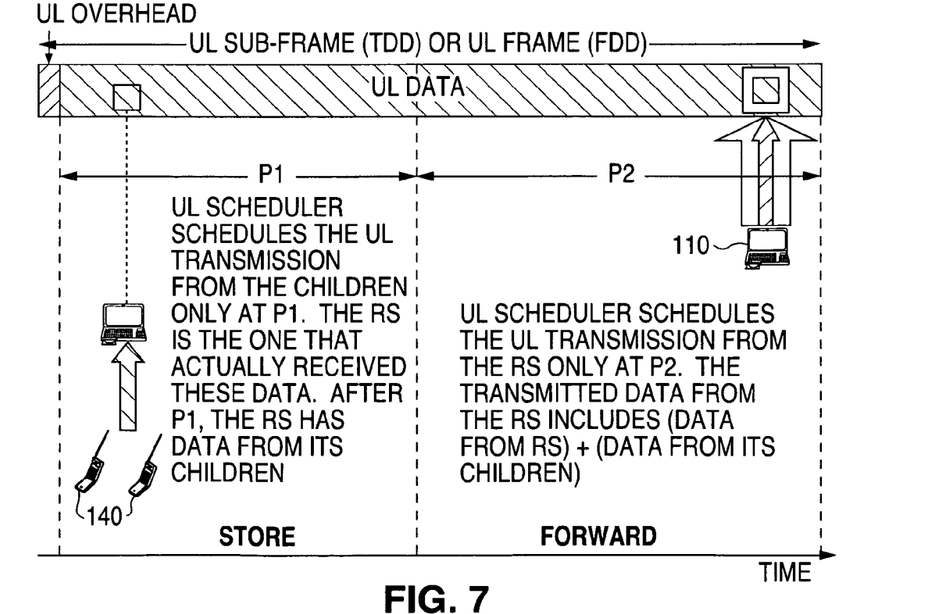

The BTS 102 in the present system 100, more particularly the DL/UL scheduler 210, includes additional processing capabilities or modifications to operate in accordance with the teachings described herein. The BTS DL/UL scheduler 210 functions are modified to enable relaying in the system 100. FIGS. 6 and 7 illustrate DL scheduling and UL scheduling, respectively, utilized in the system 100 in accordance with the present disclosure. For purposes of example, the following description is provided as if the subscriber station 140 is a child of relay station 110 (see FIG. 5).

For DL scheduling when there is a child subscriber station present in the system 100, the BTS 102 schedules transmission of all subscriber station DL data (both child subscriber data and relay station DL data) within respective slot(s) during the P1 part of the scheduled DL sub-frame (TDD mode) or DL frame (FDD mode). As a result, the DL data for the child subscriber station 140 and the relay station 110 is received at the relay station 110 during the P1 portion of the DL sub-frame (or frame). Transmission by the BTS 102 of the child subscriber station 140 DL data occurs at a predetermined data rate in accordance with a selected modulation scheme. Due to its knowledge of the DL/UL scheduling information from the BTS (retrieved from DL sub-frames), the relay station knows where to find the DL data of its child subscriber 140.

It will be understood that the relay station may or may not have its own active ongoing communication session with the BTS 102. The relay station might be a fixed or pseudo-fixed station that acts as a relay station without operating its own communication session for remote communications.

Relay station 110 receives and decodes the DL data of the child subscriber station 140. It will be understood that the received DL data is received in the form of RF signals which is decoded or demodulated into decoded DL data. The decoded DL data is stored in memory 302.

The relay station 110 is also scheduled (under control of the BTS 102) to transmit the child subscriber station DL data it received (for its children) within respective slot(s) during the P2 part of the scheduled DL sub-frame (TDD mode) or DL frame (FDD mode). The child subscriber station DL data received during P1 is transmitted from the relay station 110 to the child subscriber station 140 during the P2 portion of the frame. Thus, the stored DL data is encoded using the modulation scheme and transmitted by the relay station 110 in the proper slot within P2. The relay station 110 receives an RF signals (carrying DL data) from the base station 102 during P1, demodulates the signals into DL data, stores the DL data, modulates the stored DL data into RF signals, and transmits the RF signals during P2.

When a relay station services multiple child subscriber stations, all of the DL data for the children subscriber stations is transmitted (from the BTS 102 to relay station) during P1, and the relayed DL data is transmitted (from relay station to children subscriber stations) during P2. The relative size of P1 and P2 may be fixed or determined at least partly based on the number of child subscriber stations (the more children in the system 100, the larger P2 may need to be).

In one embodiment, the DL data received at the relay station 110 during P1 of a DL frame is relayed during P2 of the same DL frame. In another embodiment, the received DL data may be relayed during P2 of a subsequent or later DL frame. This may be accomplished by buffered or frame-delayed relaying. It will be appreciated that during P2 of the DL sub-frame, the BTS 102 does not actually transmit data for any children subscriber stations. In the DL, a relay station first receives its own data plus data for its children from the BTS, then forwards the data to its children at a later time.

The UL process is similar. For UL scheduling when there is a child subscriber station present in the system 100, the BTS 102 schedules transmission of all subscriber station UL data (both child subscriber data and regular station UL data) within respective slot(s) during the P1 part of the scheduled UL sub-frame (TDD mode) or UL frame (FDD mode). As a result, the UL data for the child subscriber station 140 is received at the relay station 110 during the P1 portion of the UL sub-frame (or frame). Transmission by the child subscriber station 140 of its UL data occurs at a predetermined data rate in accordance with a selected modulation scheme. Due to its knowledge of the DL/UL scheduling information from the BTS (retrieved from DL sub-frames), the relay station knows where to find the UL data of its child subscriber 140 in the UL sub-frame.

Relay station 110 receives and decodes the UL data received from the child subscriber station 140. It will be understood that the received UL data is received in the form of RF signals which are decoded or demodulated into decoded UL data. The decoded UL data is stored in memory 302.

The relay station 110 is also scheduled (under control of the BTS 102) to transmit the child subscriber station UL data it received (from its children) within respective slot(s) during the P2 part of the scheduled UL sub-frame (TDD mode) or DL frame (FDD mode). The child subscriber station UL data received during P1, along with the relay station's UL data, is transmitted from the relay station 110 to the BTS 102 during the P2 portion of the frame. Thus, the stored UL data is encoded using the modulation scheme and transmitted from the relay station 110 (to the BTS 102) in the proper slot within P2. The relay station 110 receives RF signals (carrying UL data) from the child subscriber station 140 during P1, demodulates the signals into UL data, stores the UL data, modulates the stored UL data into RF signals, and transmits the RF signals during P2 to the BTS 102.

When a relay station services multiple child subscriber stations, all of the UL data from its children subscriber stations is transmitted during P1, and the received relayed child subscriber data, in addition to the relay station's own UL data (if present), is transmitted from the relay station 110 to the BTS 102 during P2. The relative size of P1 and P2 may be fixed or determined at least partly based on the number of child subscriber stations.

In one embodiment, the UL data received at the relay station 110 during P1 of a UL frame is relayed during P2 of the same UL frame. In another embodiment, the received UL data may be relayed during P2 of a subsequent (or later) UL frame. This may be accomplished by buffered or frame-delayed relaying. It will be appreciated that during P1 of the UL sub-frame, the BTS 102 does not actually use data received from any children subscriber stations. In the UL, a relay station first receives data from its children, then forwards this children data plus its own data to the BTS at a later time.

As described, the store and forward does not have to be completed within one frame. The scheduler may schedule storing in the received frame and forwarding in another frame. Utilization of this embodiment may depend on different factors—for fast frames (WiMax frame duration may be 2.5 ms to 20 ms) or slower processors in the relay station, the process may take more than one frame. Moreover, the store-and-forward process described herein is intended to only relay the data, not the control channel or control-type information in the DL or UL sub-frames (though this may be done, if desired). However, the control channel does not require high data rates (modulation and coding is conservative).

Now turning to FIG. 8, there is illustrated a front-end for a relay station 110a, 120a, 130a for use in an FDD system. The relay station includes a switching mechanism, including switches 800a through 800f, duplexers 802a, 802b, power amplifiers 804a, 804b and low noise amplifiers 806a, 806b, as shown. In FDD mode, the BTS 102 only transmits at BTS transmit frequencies and receives at BTS receive frequencies. The subscriber stations only transmit at BTS receive frequencies and only receives at BTS transmit frequencies. In this mode, a subscriber station cannot communicate with other subscriber stations. To operate as a relay station as described above, the station must be operable to communicate with both the BTS 102 and other subscriber stations. Therefore, the relay station 110a, 120a, 130a is operably to transmit/receive at both sets of BTS transmit and receive frequencies and transmit/receive at both sets of subscriber station transmit and receive frequencies. The structure shown in FIG. 8 enables this functionality. The switches 800a through 800f are configured with the other components to switch back and forth between the two sets of frequencies—BTS transmit/receive frequencies and subscriber station transmit/receive frequencies.

It will be understood that the most likely candidates for a subscriber station operating as a relay station are laptop computers. Though not precluded from operating as such, handheld communication devices are less likely to be used as the relay station. Acting as a relay station requires high activity because the relay station will transmit/receive its own data as well as transmit/receive data from its "children" subscriber stations. This results in the need for higher CPU power and electrical power as compared to a conventional operating subscriber station.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A wireless communication device comprising:
a processor;
a relay station module coupled to the processor; and
a transceiver unit coupled to the processor and configured to transmit and receive downlink (DL) frames and uplink (UL) frames via an air interface, wherein each of the DL and UL frames includes a data portion having a first sub-portion and a second sub-portion;
wherein the processor is configured to operate the wireless communication device as a subscriber station in a first mode for communication directly with a base station, and as both the subscriber station and as a relay station in a second mode for communication between another subscriber station and the base station; and
wherein during operation in the second mode, the relay station module is configured to schedule the transceiver unit to receive first data for the wireless communication device from the base station during a first slot of the first sub-portion of a given DL frame, and to receive second data for the another subscriber station during a second slot of the first sub-portion of the given DL frame, wherein the relay station module is further configured to schedule the transceiver unit to transmit the second data to the another subscriber station during the second sub-portion of a DL frame that is subsequent to the given DL frame.

2. The wireless communication device of claim 1, wherein during operation in the second mode, the relay station module is configured to schedule the transceiver unit to:
receive third data from the another subscriber station during a first slot of the first sub-portion of a given UL frame; and
transmit the third data to the base station during a first slot of the second sub-portion of a UL frame that is subsequent to the given UL frame.

3. The wireless communication device of claim 2, wherein during operation in the second mode, the relay station module is configured to schedule the processor to store the second data and the third data in the memory prior to scheduling the transceiver to transmit the second data and the third data.

4. The wireless communication device of claim 1, wherein the processor is configured to operate the wireless communication device in the second mode in response to a receiving an assignment of the another subscriber station to the wireless communication device by the base station.

5. The wireless communication device of claim 1, wherein during operation in the first mode the relay station module is configured to schedule the transceiver unit to receive the first data for the wireless communication device from the base station during the first slot of the first sub-portion of a given DL frame, and to schedule the transceiver unit to transmit third data of the wireless communication device to the base station during the second sub-portion of a given UL frame.

6. The wireless communication device of claim 1, wherein the relay station module is configured to:
receive UL frames from one or more additional subscriber stations;

measure a signal-to-noise ratio (SNR) of the UL frames of the one or more additional subscriber stations;

provide SNR values of the one or more additional subscriber stations to the base station for a determination of which, if any, of the one or more additional subscriber stations will be assigned by the base station to the wireless communication device.

7. The wireless communication device of claim 1, wherein the relay station module is configured to receive scheduling information from the base station in a control portion of a given DL frame.

8. The wireless communication device of claim 1, wherein the first sub-portion and the second sub-portion of each of the DL and UL frames have a variable size dependent upon a number of additional subscriber stations assigned to the wireless communication device during operation in the second mode.

9. The wireless communication device of claim 1, wherein the relay station module comprises software instructions stored within the memory and executable by the processor.

10. A method comprising:
   transmitting and receiving, by a wireless communication device, downlink (DL) frames and uplink (UL) frames via an air interface, wherein each of the DL and UL frames includes a data portion having a first sub-portion and a second sub-portion;
   operating the wireless communication device in a first mode as a subscriber station for communication directly with a base station, and in a second mode as both the subscriber station and as a relay station for communication between another subscriber station and the base station; and
   operating in the second mode in response to receiving information corresponding to the another subscriber station from the base station;
   wherein during operation in the second mode:
      receiving first data for the wireless communication device from the base station in a first slot of the first sub-portion of a given DL frame, and receiving second data for the another subscriber station during a second slot of the first sub-portion of the given DL frame;
      transmitting the second data to the another subscriber station during the second sub-portion of a subsequent DL frame.

11. The method of claim 10, wherein during operation in the second mode, receiving third data from the another subscriber station during a first slot of the first sub-portion of a given UL frame, and transmitting the third data to the base station during a first slot of the second sub-portion of a UL frame that is subsequent to the given UL frame.

12. The method of claim 11, wherein during operation in the second mode, storing the second data and the third data in a buffer memory prior to transmitting the second data and the third data.

13. The method of claim 10, wherein operating in the second mode in response to receiving information corresponding to the another subscriber station from the base station comprises receiving an assignment of the another subscriber station to the wireless communication device as a child subscriber station.

14. The method of claim 10, wherein during operation in the first mode receiving the first data for the wireless communication device from the base station during the first slot of the first sub-portion of a given DL frame, and transmitting third data of the wireless communication device to the base station during the second sub-portion of a given UL frame.

15. The method of claim 10, further comprising:
   receiving UL frames from one or more additional subscriber stations;
   measuring a signal-to-noise ratio (SNR) of the UL frames of the one or more additional subscriber stations;
   transmitting SNR values corresponding to the SNR of the one or more additional subscriber stations to the base station for a determination of which, if any, of the one or more additional subscriber stations will be assigned by the base station to the wireless communication device.

16. The method of claim 10, wherein the first sub-portion and the second sub-portion of each of the DL and UL frames have a variable size dependent upon a number of additional subscriber stations assigned to the wireless communication device during operation in the second mode.

* * * * *